Patented Mar. 11, 1941

2,234,206

UNITED STATES PATENT OFFICE 2,234,206

COATED ALUMINUM

John S. Thompson, Detroit, Mich., assignor to Metal Finishing Research Corporation, Detroit, Mich., a corporation of Michigan No Drawing. Application June 3, 1935, Serial No. 24,718. Renewed August 29, 1939

3 Claims. (Cl. 148—6)

This invention relates to coated aluminum. The object is the production of aluminum coated with a coating of substantial thickness substantially integral with the surface of the metal, forming an electrical and heat insulating coating and constituting a good base for paint or the like.

Aluminum has been treated in an attempt to produce coatings having the general characteristics indicated above. This improvement consists essentially in providing aluminum or its alloys, such as the alloy commonly referred to as duralumin, with a phosphate coating essentially similar to that which has been for many years applied to iron and steel surfaces as a rust preventative and base for paints and the like. Such a coating consists essentially of a relatively insoluble phosphate produced by chemical reaction at the surface of the metal in such a way that it constitutes a substantially integral part of the metal.

Such a coating can be produced upon aluminum by a suitable phosphate solution properly accelerated. The present application is directed to the coated article rather than to the method of producing the same, but since no method of producing this article has been known hitherto or appears to be obvious from prior publications, patents or known practices, sufficient information will be given to enable anyone skilled in the art to produce a phosphate coating on aluminum and its alloys.

Such coatings may be produced by a wide variety of solutions containing acid phosphate, a compound comprising a metal, such as iron, manganese, zinc, or cadmium, that will form a suitable substantially insoluble phosphate, and an accelerating agent, such as a compound of fluorine, that will enable the insoluble phosphate to form on the aluminum surface. A detailed example will be given where manganese is included as the phosphate-forming metal.

A solution of manganese dihydrogen phosphate may be produced in any suitable manner. One advantageous way for producing such a solution is to dissolve manganese carbonate in a cold solution of phosphoric acid in substantially combined ratios so as to form a salt corresponding to the formula $Mn(H_2PO_4)_2$. The manganese dihydrogen phosphate may be introduced into a solution with potassium fluoride and manganese silico fluoride so that in 100 cc. of the solution there is about the equivalent of eight (8) grams of manganese dihydrogen phosphate, fifty (50) grams of $MnSiF_6.6H_2O$, four (4) grams $KF.2H_2O$. Such a solution may be placed directly upon the aluminum surface to be coated preferably with an inert material such as fuller's earth or dicalite and with a wetting and bubble-reducing agent such as casein, starch or the like. After being allowed to dry on the surface for ten minutes or so, the residue may be washed off and a dark gray coating of essentially manganese phosphate will remain, said coating being of substantial thickness and firmly adherent to the aluminum.

An inert material which is very desirable may be made by gently heating manganese silicofluoride to leave the manganese fluoride as a skeleton body. This is desirably porous, seems to reduce the objectionable bubbles during the coating action, and is readily removable after the coating has formed.

The resultant coating varies somewhat in composition under varying conditions, but one analysis of a coating formed in the manner indicated above showed the presence of approximately 31% Mn, 38% $PO_4$, 6% F and 0.2 Al.

As indicated above, other soluble fluorine compounds may be employed, and other metals than manganese may be used. Zinc can be employed readily, but care must be exercised in the use of cadmium, as it plates out on aluminum and so must not be used in excess. It is not necessary for the coating metal to be added in both the phosphate and fluorine compound. For example, in the above formula, sodium phosphate may be employed successfully if the manganese is present in another compound, also magnesium silico-fluoride, for example, may be used instead of the manganese silico-fluoride, if manganese is present in the solution in some soluble compound, the apparent requirements being the presence in the solution of the $PO_4$ ion, an ion of a coating metal, such as iron, manganese, zinc or cadmium, and fluorine, in suitable proportions and without incompatible chemicals.

As indicated above, the method is described in this application only to provide a way in which the article may be produced, the coated article being the object of this application.

What I claim is:

1. An article having a surface of aluminum or an alloy of aluminum and coated with a substantial, closely adherent coating at least 65% of which is a substantially insoluble phosphate of a metal which also forms a soluble acid phosphate and at least 6% of a fluoride.

2. An article having a surface of aluminum or an alloy of aluminum and coated with a substantial, closely adherent coating more than 65% manganese phosphate and upwards of 6% of fluoride.

3. An article having a surface of aluminum or alloy thereof and coated with a substantial, closely adherent coating the major portion of which is a substantially insoluble phosphate of a metal which also forms a soluble acid phosphate, said phosphate being bound to the aluminum surface by direct chemical action therewith simultaneous with the formation of the insoluble phosphate.

JOHN S. THOMPSON.